US010709220B2

(12) United States Patent
Poon et al.

(10) Patent No.: US 10,709,220 B2
(45) Date of Patent: Jul. 14, 2020

(54) PROTECTIVE DEVICE CASE (71) Applicant: Griffin Technology, LLC, Irvine, CA (US)

(72) Inventors: Daniel Poon, Nashville, TN (US); Tony Ray Plunk, Fairview, TN (US)

(73) Assignee: Griffin Technology, LLC, Irvine, CA (US)

( * ) Notice: Subject to any disclaimer, the term of this patent is extended or adjusted under 35 U.S.C. 154(b) by 113 days.

(21) Appl. No.: 15/068,868

(22) Filed: Mar. 14, 2016

(65) Prior Publication Data

US 2017/0135454 A1 May 18, 2017

Related U.S. Application Data

(60) Provisional application No. 62/132,002, filed on Mar. 12, 2015.

(51) Int. Cl.
*A45C 11/00* (2006.01)
*H04B 1/3888* (2015.01)

(52) U.S. Cl.
CPC ............ *A45C 11/00* (2013.01); *H04B 1/3888* (2013.01); *A45C 2011/002* (2013.01)

(58) Field of Classification Search
CPC .............. A45C 11/00; A45C 2011/002; A45C 2011/003; H04B 1/3888; G06F 1/1626; G06F 2200/1633
See application file for complete search history.

(56) References Cited

U.S. PATENT DOCUMENTS

| 7,230,823 | B2 * | 6/2007 | Richardson | G06F 1/1626 220/23.91 |
| 8,439,191 | B1 * | 5/2013 | Lu | H04B 1/3888 206/320 |
| 9,323,292 | B2 * | 4/2016 | Bae | G06F 1/1656 |
| 9,526,320 | B2 * | 12/2016 | Roberts | A45C 11/00 |
| 2013/0063004 | A1 * | 3/2013 | Lai | H04R 1/02 312/223.1 |
| 2013/0146491 | A1 * | 6/2013 | Ghali | G06F 1/1626 206/320 |
| 2014/0069825 | A1 * | 3/2014 | Macrina | A45C 11/00 206/37 |
| 2017/0049199 | A1 * | 2/2017 | Kim | A45C 11/00 |

* cited by examiner

*Primary Examiner* — Corey N Skurdal (57) ABSTRACT

A protective case for a portable electronic device includes a back frame and a front cover. The back frame has a rigid plastic back frame with an elastomeric material bonded to portions of the plastic frame. An elastomeric insert is positioned around a portion of the interior perimeter of the back frame to provide impact resistance. Back frame engagement members are positioned on the perimeter of the rigid plastic back frame. The front cover mates with the back frame to enclose the elastomeric insert and the device. The front cover includes a touch screen cover and a rigid plastic front frame bonded to a perimeter of the touch screen cover. Front cover engagement members extend from the rigid plastic front frame that engage the back frame engagement members to hold the front cover on the back frame and enclose the device.

11 Claims, 7 Drawing Sheets

PROTECTIVE DEVICE CASE

CROSS-REFERENCES TO RELATED APPLICATIONS

The present Utility patent application is based upon and claims priority from U.S. Provisional Patent Application No. 62/132,002 filed Mar. 12, 2015 entitled "Protective Device Case".

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

A wide variety of different types and designs of cases for portable electronic devices are known. Unfortunately, many cases do not provide adequate protection against impacts caused by dropping the device. In addition, many case designs are not sufficiently resistant to moisture or dust. Therefore, what is needed is a protective case design that provides an enhanced degree of impact, dust and moisture protection.

BRIEF SUMMARY OF THE INVENTION

An embodiment of the present invention is directed toward a protective case for a portable electronic device. The protective case includes a back frame and a front cover. The back frame includes a rigid plastic back frame having an elastomeric material bonded to portions of the rigid plastic back frame. The elastomeric material bonded to portions of the rigid plastic back frame forms a series of raised bumpers around the exterior surfaces of the protective case. Back frame engagement members are positioned on the perimeter of the rigid plastic back frame.

An elastomeric insert is positioned around at least a portion of an interior perimeter of the back frame. The elastomeric insert has a plurality of compressible structures that provide impact cushioning for a portable electronic device enclosed in the protective case. The elastomeric insert also includes flexible button cover portions that allow the controls of the portable electronic device to be used while the portable electronic device is enclosed within the protective device case.

The front cover mates with the back frame to enclose the elastomeric insert and the portable electronic device. The front cover includes a touch screen cover and a rigid plastic front frame bonded to the perimeter of the touch screen cover. The front cover also includes an opening in the touchscreen cover that corresponds to a location of a device control when the protective cover is installed over the device and a flexible membrane that covers the opening. Front cover engagement members extend from the rigid plastic front frame. The front cover engagement members engage the back frame engagement members on the plastic back frame to hold the front frame on the back frame and enclose the portable electronic device. The front frame engagement members extend down from the rigid plastic front frame and are positioned around an exterior perimeter of the portable electronic device. The front engagement members may be protrusions extending from the front cover having hooked lips. The extended portions of the front cover snap into the corresponding back frame engagement members to secure the front cover to the back frame and enclose the portable electronic device. The front cover includes a removal tab that facilitates removal of the front cover from the back frame.

In an alternative embodiment of the present invention, the front cover slides over the back frame and over the elastomeric insert to form the protective case and enclose the portable electronic device. In such an embodiment, the front cover engagement members are extended portions positioned around the perimeter of the front cover and the back frame engagement members are overhanging portions of the back frame. The extended portions of the front cover slide under the overhanging portions of the back cover to secure the front cover to the back frame and enclose the portable electronic device with the protective device case.

DETAILED DESCRIPTION OF THE INVENTION

Figure 1:
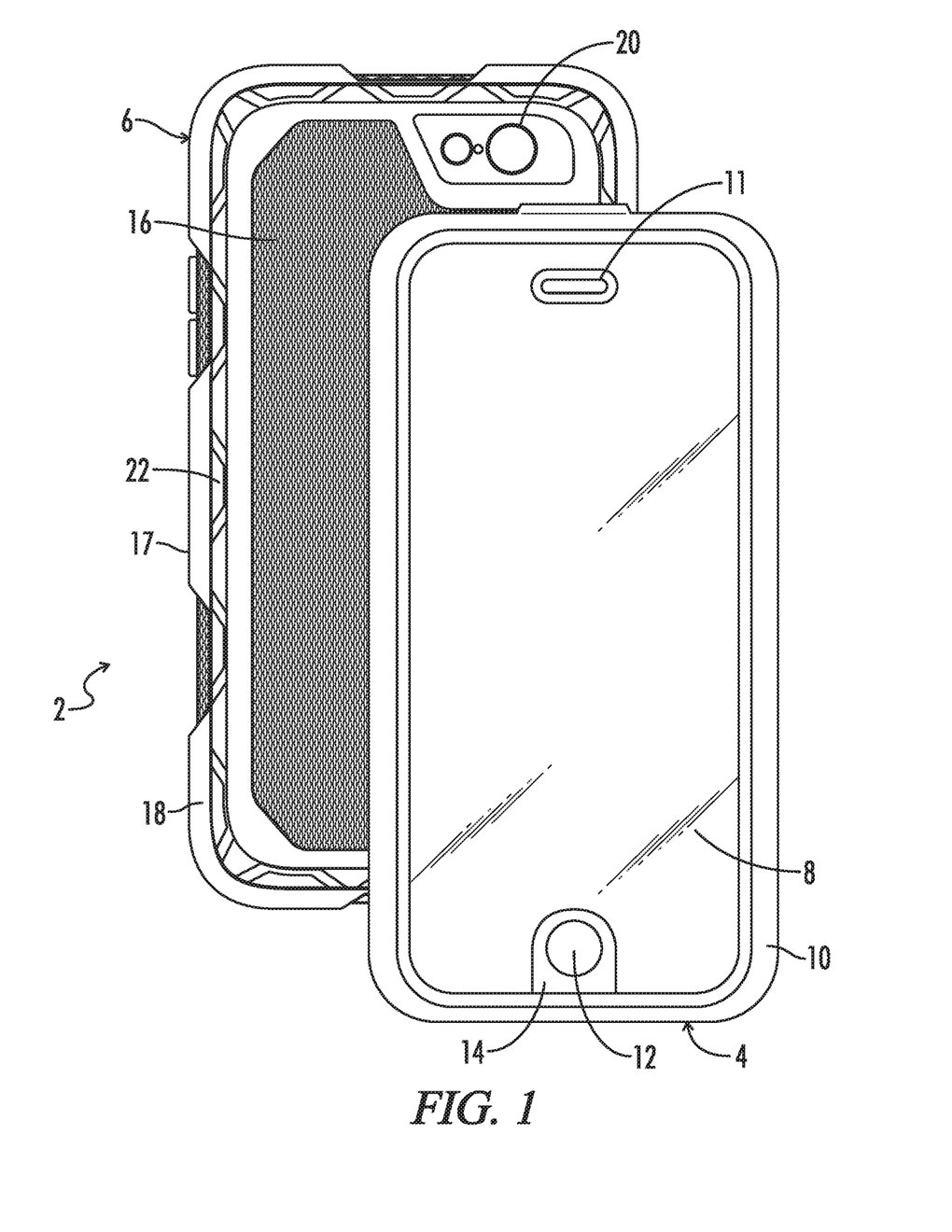
FIG. 1 is an illustration of an unassembled protective device case constructed in accordance with an embodiment of the present invention.

Referring now to FIG. 1, an illustration of an unassembled protective device case 2 constructed in accordance with an embodiment of the present invention is shown. The protective device case has two primary pieces, a front cover 4 and a back frame 6. The front cover 4 has a touchscreen cover 8 bonded to a rigid plastic frame 10 that surrounds the perimeter of the touchscreen cover 8. The touchscreen cover 8 includes a speaker opening 11 and a button opening 12 covered by a flexible membrane 14 that allows the covered button to be operated. The back frame 6 includes a rigid plastic frame 16 with a flexible elastomeric layer 18 bonded over portions of the rigid plastic frame 16 to form cushioning bumpers 17. Preferably, the rigid plastic is a shatter-resistant polycarbonate that is clad in an elastomeric, rugged, shock-absorbing silicone. A camera opening 20 is provided in the rigid back frame 6 to allow the enclosed device's camera to be used while the device is enclosed within the protective case 2. An elastomeric insert 22 is positioned inside the back frame 6 around its perimeter to provide impact cushioning for the enclosed device.

Figure 2A:
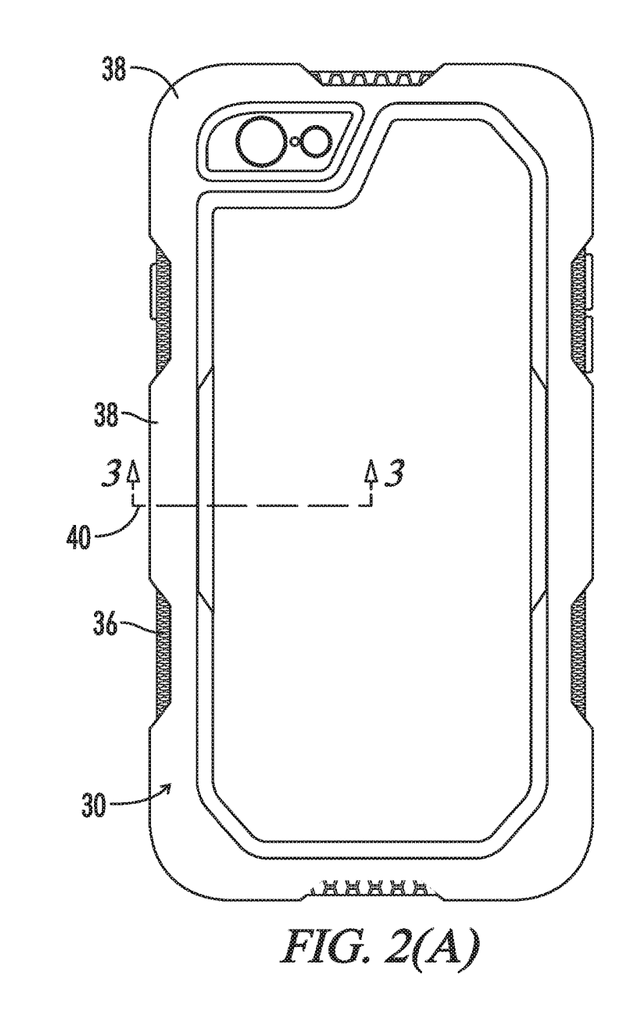
FIGS. 2(A)-2(C) are respectively back, front and side views of the assembled protective device case of FIG. 1.
Figure 2B:
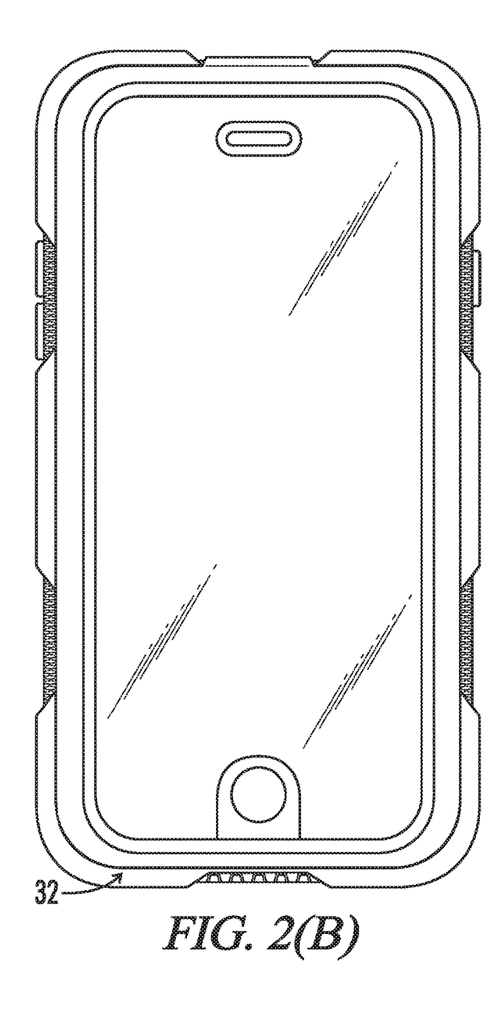
Figure 2C:
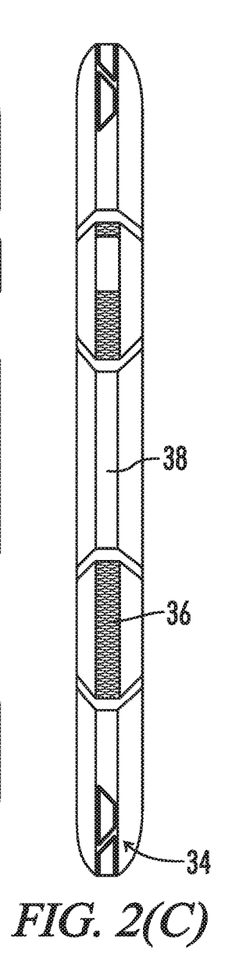

Referring now to FIGS. 2(A)-2(C) back 30, front 32, and side views 34 of the assembled protective device case of FIG. 1 are shown. As discussed above, alternating patches of exposed hard plastic 36 and elastomeric material 38 bonded over the hard plastic 36 to form bumpers 38 around the edges of the case.

Figure 3:
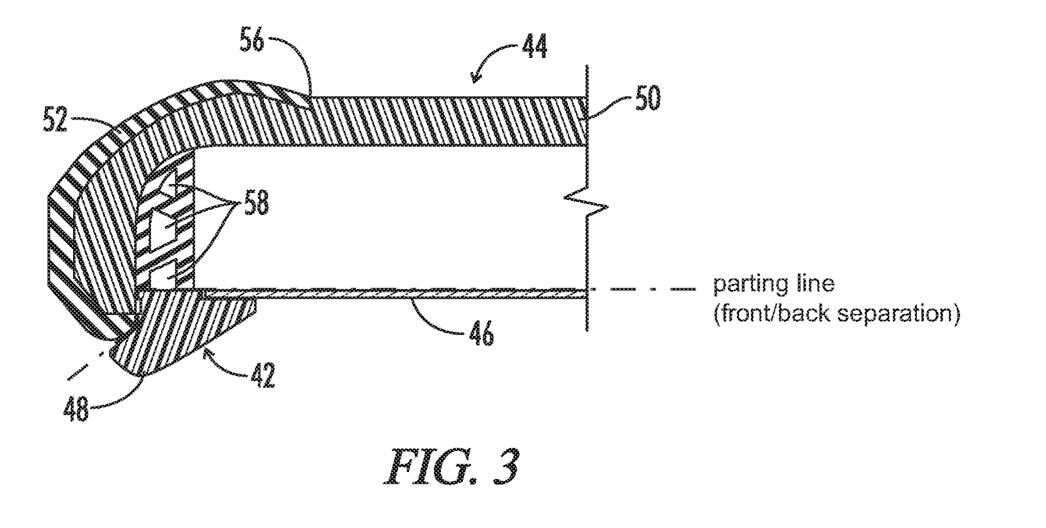
FIG. 3 is an illustration of a cross section of the assembled device case of FIG. 1.

Referring now to FIG. 3, an illustration of a cross section of the assembled device case of FIGS. 2(A)-2(C) along the line 40 is shown. The front cover 42 includes the touchscreen cover 46 bonded to the hard plastic 48 perimeter. The back frame 44 has the rigid plastic frame 50 and with the elastomeric overlaid portions 52. The elastomeric insert 54 positioned in the back frame 44 has compressible cavities 58 that cushion an enclosed device from any impacts. Connectors such as snap connectors, discussed in more detail below, between the front cover 42 and back frame 44 compress the elastomeric insert 54 between the rigid plastic 48 of the front cover and the rigid plastic 50 of the back frame. The compression of the elastomeric insert 54 between rigid plastic of the front cover 42 and the back frame 44 creates a dust and moisture resistant seal that protects the electronic device held within the case. Grooves, cavities and similar features 56 are provided on the hard plastic 48 of the back frame 44 to assist in securing the elastomeric portions 52 to the plastic.

Figure 4:
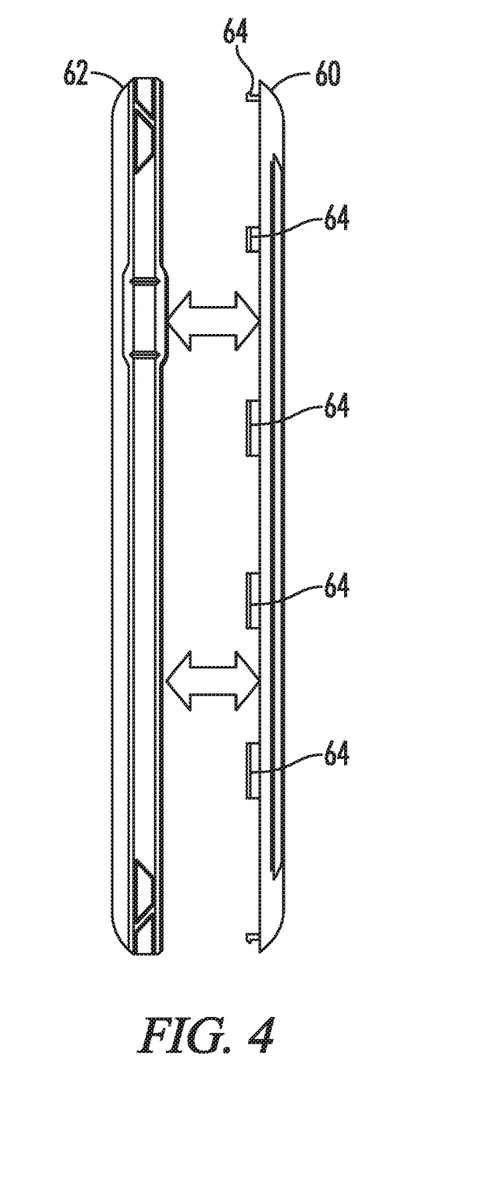
FIG. 4 is an illustration of the engagement of a front cover and back frame of a protective device case constructed in accordance with an embodiment of the present invention.

Referring now to FIG. 4, an illustration of the engagement of a front cover 60 and back frame 62 of a protective device case constructed in accordance with an embodiment of the present invention is shown. The snap connections are formed between extended protrusions 64 on the front cover 60 of the case that mate with corresponding features on the back frame 62. While snap connectors are preferred a variety of other types of connectors well known in the art could be used.

Figure 5:
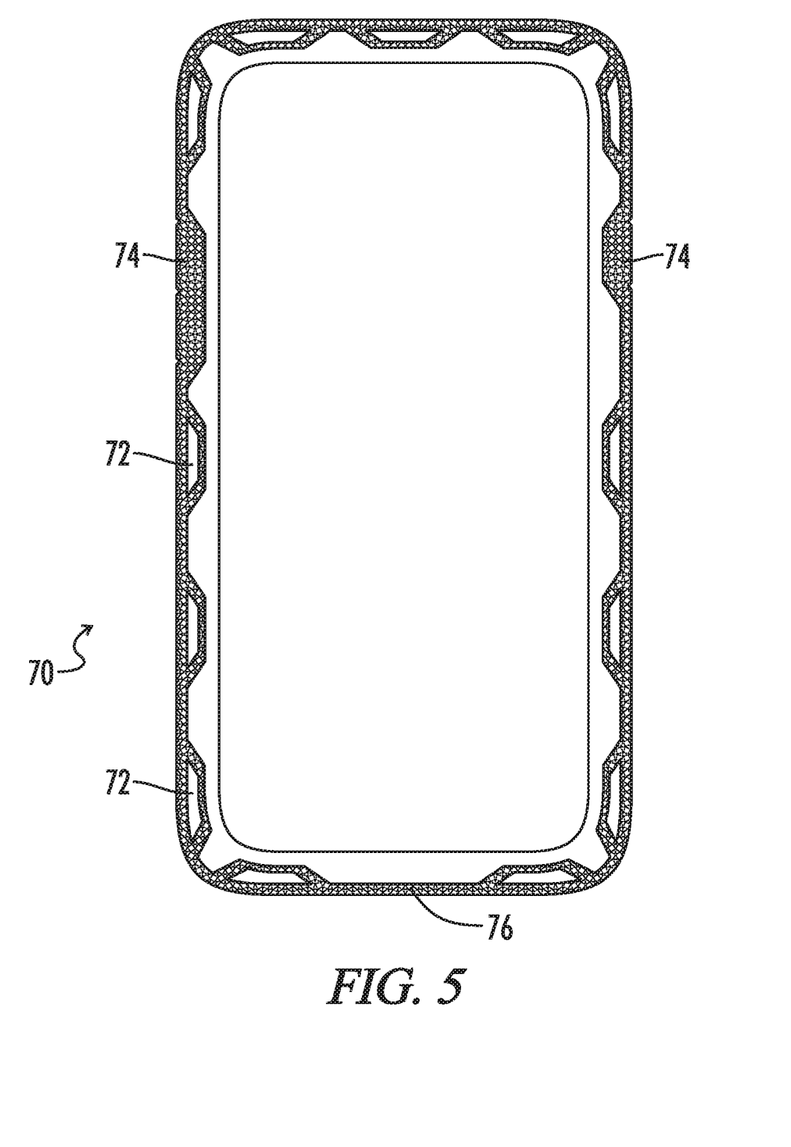
FIG. 5 is an illustration of an elastomeric insert having compressible structures for use in a protective device case constructed in accordance with an embodiment of the present invention.

Referring now to FIG. 5, is an illustration of a preferred elastomeric insert 70 having compressible structures 72 for use in a protective device case constructed in accordance with an embodiment of the present invention is shown. The compressible structures 72 are positioned so that the surround the perimeter of the enclosed device. The elastomeric insert 70 has button covering portions 74 that correspond to the location of the device's controls. These flexible button covering portions 74 allow the controls of the enclosed device to be activated while the device is enclosed within the assembled case with its perimeter surrounded by the elastomeric insert 70. Openings 76 are provided in the elastomeric insert that allow external cables to be connected to the device's connectors while it is enclosed in the protective case. Those skilled in the art will appreciate that the location of the button covering portions 74 and the openings 76 will depend upon the configuration of the device for which the case is designed.

Figure 6:
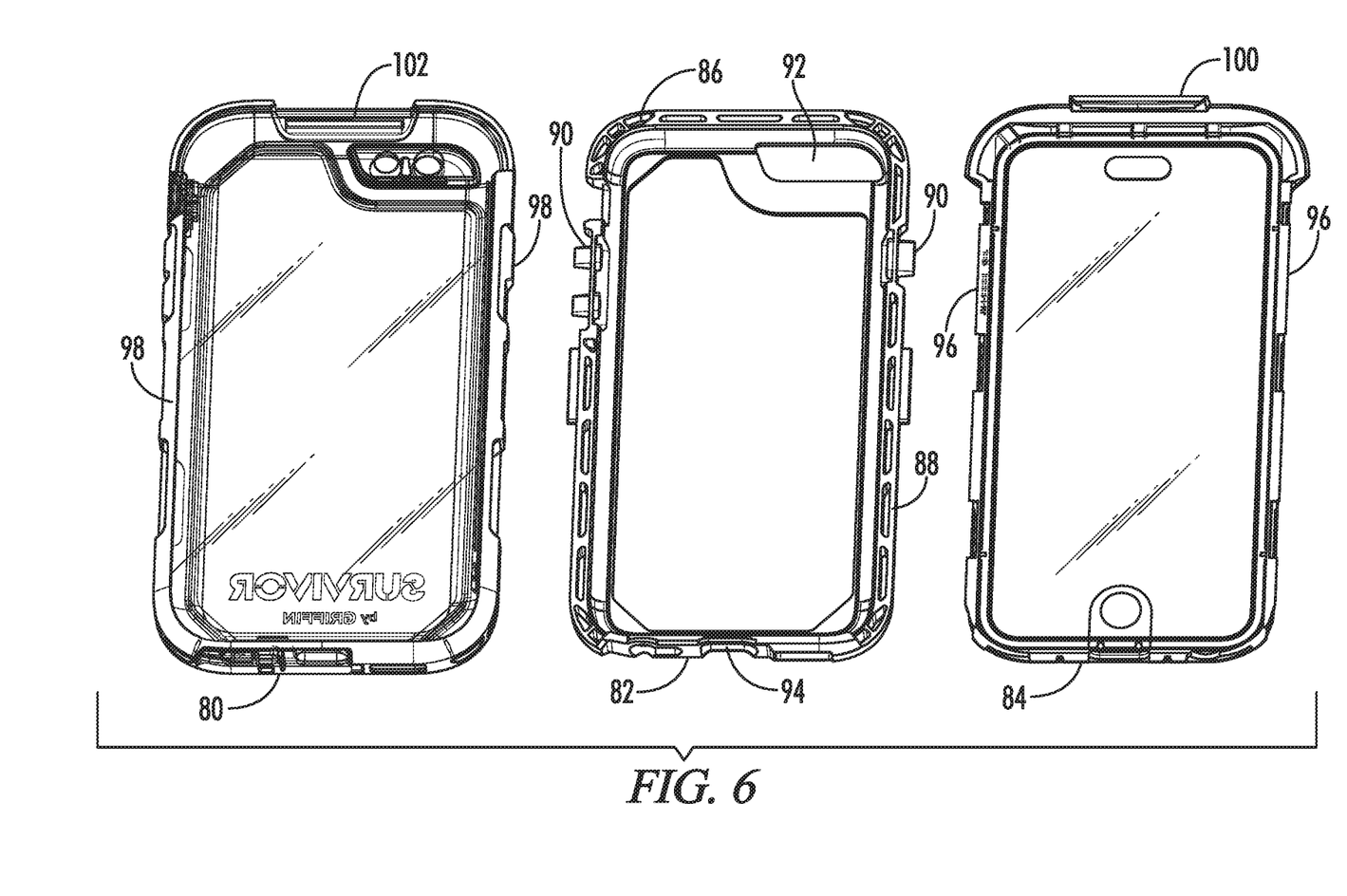
FIG. 6 is an illustration of another protective device case constructed in accordance with an embodiment of the present invention.
Figure 7:
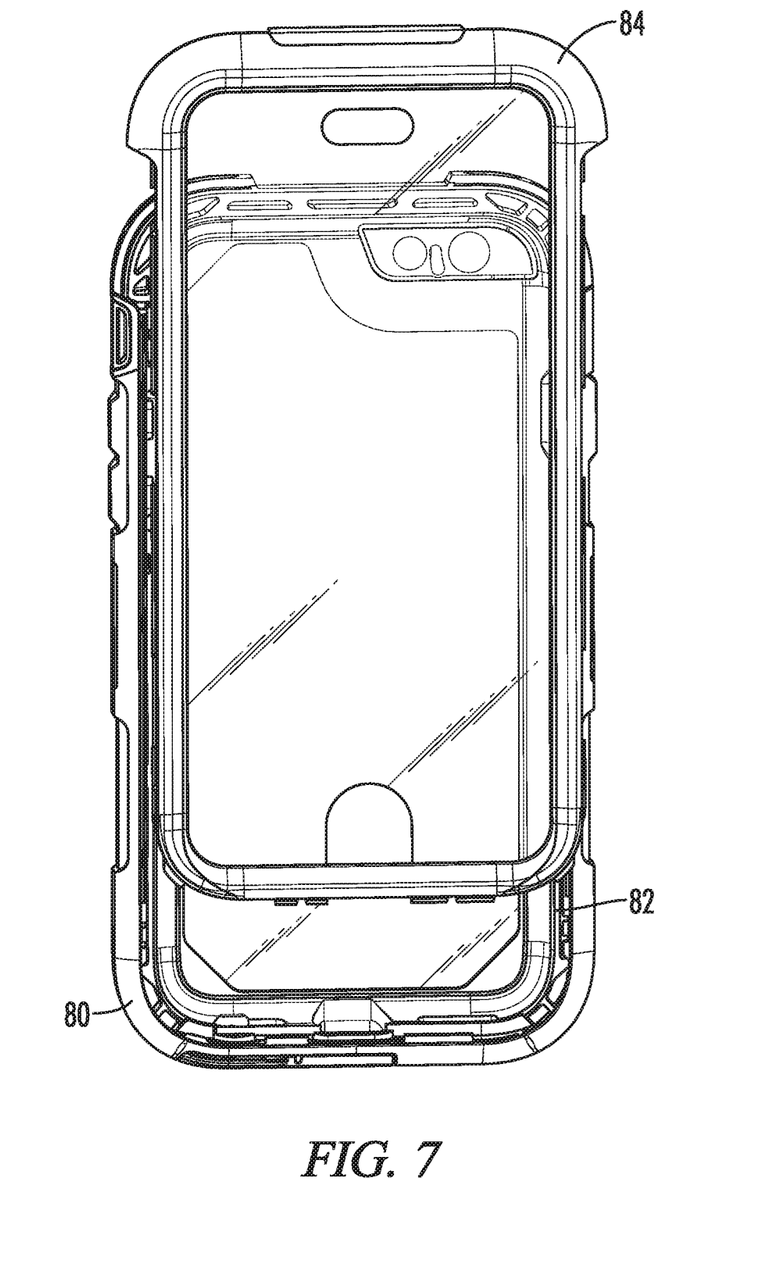
FIG. 7 is an illustration of the protective device case of FIG. 6 showing the front cover being inserted over the back frame and elastomeric insert.

Referring now to FIG. 6, an illustration of another protective device case constructed in accordance with an embodiment of the present invention. In the embodiment shown, the case is assembled by placing the elastomeric insert 82 in the back frame 80, and sliding the front cover 84 over the back frame 80 and elastomeric insert 82. FIG. 7 is an illustration of the protective device case of FIG. 6 showing the front cover being inserted over the back frame and elastomeric insert. The elastomeric insert 82 has compressible structures 86 and 88 that increase the impact resistance of the case. Pads 90 are provided on the insert 82 that allow the controls of an enclosed device to be operated. Openings 94 in the elastomeric insert 82 allow external cable connections to an enclosed device. In the embodiment shown, the volume and power buttons of the device are covered, and hinged plugs seal the connectors, headphone port and hold switch.

Extended portions 96 on the perimeter of the front cover 84 slide under overhanging portions 98 of the back frame 80 to secure the front cover to the back frame and enclose the portable electronic device within the protective device case. A locking extension 100 on the top of the front cover snaps onto a corresponding portion 102 on the top of the back frame when the front cover is fully inserted into the back frame to secure the front and back together. The locking extension 100 also functions as a finger grip that assists in the removal of the front cover from the back frame.

Although there have been described particular embodiments of the present invention of a new and useful Protective Device Case, it is not intended that such references be construed as limitations upon the scope of this invention except as set forth in the following claims.

What is claimed is:

1. A protective case for a portable electronic device comprising:
   a device compartment dimensioned to retentively receive the portable electronic device, said device compartment comprising:
   opposing front face and back face walls,
   opposing left and right side walls, and
   opposing top and bottom side walls connected to and generally perpendicular to said left and right side walls,
   wherein multiple separable components including a back frame, a unitary elastomeric insert, and a front cover define the device compartment;
   wherein the back frame is configured to define the back face wall and a plurality of side walls, said back frame comprising:
   a rigid plastic frame defined by an outwardly facing surface and an opposing inwardly facing surface that defines an interior perimeter;
   an outermost elastomeric material bonded to discrete portions of the outwardly facing surface of the rigid plastic frame, and
   rigid plastic attachment extensions positioned on and extending from the interior perimeter of said rigid plastic back frame at opposing side walls;
   wherein the unitary elastomeric insert has an outer surface and an opposing inner surface, wherein the outer surface is positioned in contact with the interior perimeter of said rigid plastic frame and the inner surface is in contact with the portable electronic device when the device is inserted into the case;
   wherein the elastomeric insert extends from the back face wall towards the attachment extensions to define a slot there-between; and
   wherein the front cover is configured to slidably mate into a closed position with the back frame to enclose the elastomeric insert and the portable electronic device when the device is inserted in the device compartment, wherein the front cover is configured to define the front face wall and comprises a unitary rigid plastic front frame having perimeter protrusions dimensioned to be slidably received within the slot so that the rigid plastic front cover is in contact with the elastomer insert when the front cover is slidably mated to said back frame.

2. The protective case of claim 1 further including a protective cover configured to overlie the touch screen of the portable electronic device when the device is enclosed within the protective case and wherein the rigid plastic front frame is bonded to a perimeter of said protective cover.

3. The protective case of claim 1 wherein said unitary elastomeric insert is annular in shape.

4. The protective case of claim 1 wherein said unitary elastomeric insert comprises compressible cavities that are positioned to surround the portable electronic device on multiple side walls when the device is enclosed in the protective case.

5. The protective case of claim 1 wherein the outermost elastomeric material bonded to discrete portions of the outwardly facing surface of the rigid plastic frame forms a plurality of raised bumpers on the exterior of the protective case that are spaced apart from one another around the side walls of the protective case and wherein the rigid plastic frame is visibly revealed in the external spaces between the raised bumpers.

6. The protective case of claim 1 wherein when the front cover is slidably mated to the back frame the elastomeric insert is compressed between the front cover and the back frame to create a moisture resistant seal.

7. The protective case of claim 1 wherein the outermost elastomeric material bonded to discrete portions of the outwardly facing surface of the rigid plastic frame forms one or more of the external surfaces of the side walls and at least a portion of the external surface of the back face wall.

8. The protective case of claim 1 wherein when the front cover is slidably mated to the back frame, the back frame and front frame together comprise one or more of the same walls.

9. The protective case of claim 1 further comprising an external locking mechanism comprising a locking extension on the top of the front cover that is configured to snap onto a corresponding portion on the back frame so as to lock the front cover in a mated position to the back frame when the front cover is fully inserted into the back frame.

10. The protective case of claim 1 wherein said elastomeric insert further comprises protruding pads that are entirely concealed within the case and configured to interface with controls of the electronic device when the device is inserted in the protective case.

11. The protective case of claim 1 wherein said elastomeric insert further comprises an opening, corresponding in position to an opening in the rigid plastic frame of the back frame, dimensioned to allow for an external connection to the device when the device is received in the protective case.

\* \* \* \* \*